US012671726B2

(12) United States Patent
Iliescu et al.

(10) Patent No.: US 12,671,726 B2
(45) Date of Patent: Jun. 30, 2026

(54) WEB-BASED VIDEO CONFERENCING SYSTEM AND METHOD

(71) Applicant: ATI STUDIOS A.P.P.S. S.R.L., Brasov (RO)

(72) Inventors: Alexandru Iliescu, Brasov (RO); Tudor Iliescu, Brasov (RO)

(73) Assignee: ATI STUDIOS A.P.P.S. S.R.L., Brasov (RO)

( * ) Notice: Subject to any disclaimer, the term of this patent is extended or adjusted under 35 U.S.C. 154(b) by 247 days.

(21) Appl. No.: 18/549,548

(22) PCT Filed: Mar. 11, 2022

(86) PCT No.: PCT/EP2022/056352
§ 371 (c)(1),
(2) Date: Sep. 7, 2023

(87) PCT Pub. No.: WO2022/189638
PCT Pub. Date: Sep. 15, 2022

(65) Prior Publication Data
US 2024/0155012 A1 May 9, 2024

Related U.S. Application Data

(60) Provisional application No. 63/159,679, filed on Mar. 11, 2021.

(51) Int. Cl.
*H04L 65/403* (2022.01)
*H04N 5/262* (2006.01)
*H04N 7/15* (2006.01)

(52) U.S. Cl.
CPC ......... *H04L 65/403* (2013.01); *H04N 5/2628* (2013.01); *H04N 7/157* (2013.01)

(58) Field of Classification Search
None
See application file for complete search history.

(56) References Cited

U.S. PATENT DOCUMENTS 9,381,426 B1   7/2016   Hughes et al.
11,895,167 B2 *   2/2024   Lanier ................... H04N 7/152
(Continued)

OTHER PUBLICATIONS

International Search Report and Written Opinion issued in corresponding PCT Application No. PCT/EP2022/056352, mailed Sep. 2, 2022.

*Primary Examiner* — Quoc D Tran
(74) *Attorney, Agent, or Firm* — Quarles & Brady LLP

(57) ABSTRACT

A video conferencing system (10) includes at least one audience member computing device (20) having a video display (22), a web camera (26), a speaker (30) and a microphone (24). The system (10) further includes at least one presenter computing device (20), likewise having a video display (22), a web camera (26), a speaker (30) and a microphone (24). A network (16) connects the presenter and audience member computing devices (20). A server (14) is also connected to the network (16) and includes a set of instructions (50) stored on the server (14). A bidirectional communication link extends between the server (14), the presenter computing device (20), the audience member computing device (20), and the network (16). The server (14) executes the set of instructions (50) to present a video conference between a presenter (18) and an audience member (12) in a virtual venue that is visually arranged to resemble an in-person venue.

20 Claims, 5 Drawing Sheets

(56)  References Cited

U.S. PATENT DOCUMENTS

| | | | |
|---|---|---|---|
| 2009/0040288 A1* | 2/2009 | Larson ................... | H04N 7/142 |
| | | | 348/E7.078 |
| 2011/0025819 A1 | 2/2011 | Gorzynski et al. | |
| 2014/0198174 A1* | 7/2014 | Sanso ..................... | H04N 7/15 |
| | | | 704/235 |
| 2015/0261859 A1* | 9/2015 | Isensee ................ | G06F 16/287 |
| | | | 707/723 |
| 2015/0312520 A1 | 10/2015 | Nohria et al. | |
| 2018/0122254 A1 | 5/2018 | Rangan et al. | |
| 2020/0294317 A1 | 9/2020 | Segal | |
| 2020/0322395 A1 | 10/2020 | Copley et al. | |
| 2020/0349751 A1* | 11/2020 | Bentovim ............... | G09B 5/06 |

* cited by examiner

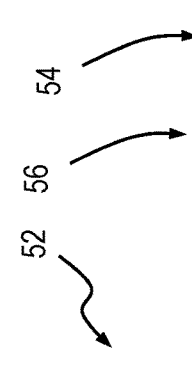

| Student | Question 1 | Question 2 | Question 3 | Question 4 | Question 5 | Question 6 | Question 7 | Question 8 | Question 9 | Question 10 | Correct Answer Percentage |
|---|---|---|---|---|---|---|---|---|---|---|---|
| 1 John Smith | Buenos dia | Cómo estás | My bien | Elefante | Cabollo | ••• | Cerdo | Perro | Elefante | ••• | 80% |
| 2 Christina Heart | Buenos dias | Cómo está | Muy bien | Elefante | Caballo | Gato | Cerdo | Perro | Elefante | Caballo | 90% |
| 3 Tamzin Hodges | Bueno dias | Cómo estás | Muy bien | Elefante | Caballo | Gato | Certo | Perro | Elefante | Caballo | 80% |
| 4 Lacy McGrath | Buenos dias | Cómo estás | Muy bin | Elefante | Caballo | Gato | ••• | Cerro | Elefante | Caballo | 70% |
| 5 Sarah-Louise Vang | Buenos dias | Cómo estás | Muy bien | Elefante | Caballo | Goto | Cerdo | Perro | ••• | Caballo | 70% |
| 6 Flynn Stanley | Buenos dias | Cómos estás | Muy bien | Perro | Caballo | Gato | Ceerdo | Perro | Elefante | Caballo | 70% |
| 7 Caris Sparks | Buenos dias | Cóme estás | Muy bienz | Elefante | Caballo | Gato | Cerdo | Perro | ••• | Caballo | 70% |
| 8 John Smith | Buenos dias | Cómo estás | Muy bien | Elefante | Caballo | Gito | Perro | Perro | Elefante | Caballo | 90% |
| 9 Michelle Davis | Benos dias | Cómo estás | Muy bien | Elefante | Caballo | ••• | ••• | Perro | Elefante | Caballo | 70% |
| 10 Michael Alan | Buenos dias | Cómo estás | Muy bien | Elephant | Caballo | Gato | Cerdos | Perro | Elefantay | Caballo | 70% |
| 11 Carol Lee | Buenos dias | Cómo aystás | Muy bien | Elefante | Caballo | Gato | Kerto | ••• | Elefante | Caballo | 70% |
| 12 David Thomas | Buenos dias | Cómo estás | May bien | Elefante | Cabello | Gato | Cerdo | Perro | Elefante | Caberro | 60% |
| 13 Cindy Blair | Buenos dias | Cómo estás | Muy bien | Elefante | Caballo | Cato | Serro | Perro | Elefante | Caberro | 80% |
| 14 Tim Wade | Buenos dias | Cómo estás | Muy bien | Elefante | Cerdo | Gato | Cerdoz | Perro | Elefante | ••• | 70% |
| 15 William Jones | Bueno dias | Cómo estádas | Muy been | Elefante | Caballo | Gato | Kertos | Pyro | Elefante | Caballo | 50% |
| 16 John Wright | Buenos dias | Cómo estás | May bien | Elefante | Caballo | Gatos | Cerdo | Perro | Elefante | Caballo | 50% |
| Question Stats | 11/16 | 11/16 | 11/16 | 14/16 | 13/16 | 10/16 | 6/16 | 13/16 | 14/16 | 13/16 | 72.5% |

*Fig. 5*

WEB-BASED VIDEO CONFERENCING SYSTEM AND METHOD

CROSS REFERENCE TO RELATED APPLICATIONS

This application represents the U.S. national stage entry of International Application No. PCT/EP2022/056352 filed Mar. 11, 2022, which claims priority to U.S. Provisional Patent Application No. 63/159,679, filed on Mar. 11, 2021, and entitled "WEB-BASED VIDEO CONFERENCING SYSTEM AND METHOD." the entire contents of which are incorporated herein by reference.

FIELD

The present invention relates generally to a web-based communications system, in particular to a web-based video conferencing system.

BACKGROUND

The concept of video conferencing was first introduced in the 1870s as part of an extension of audio devices but the first actual developments of the video telephone began in the late 1920s with Bell Laboratories. Early video conferencing experiments also took place in Germany and the United States in the late 1930s. This early video technology, conducted over telephone lines, included telephones that could transmit and receive still photos. The American Telephone and Telegraph Company (AT&T) began offering video conferencing with its "Picturephone" service in the early 1970s.

Increased use of video conferencing began with the computer revolution of the 1980s. In that time period the transmission of video images became practical for personal use with the advent of video encoders-decoders ("codecs"), along with increasing availability of broadband network service.

Network-based cameras ("webcams") began to appear on university campuses in the early 1990s. The first commercial webcam, introduced on the market in August 1994, was called QuickCam, which was compatible with Mac computers produced by Apple, Inc. A personal computer (PC) version of QuickCam was released the following year. Many businesses began to adopt video conferencing for the first time in 2004 when broadband technology became more widespread and affordable. The advent of mobile phones with video screens further increased the popularity of video conferencing. Video conferencing is now in general use by individuals, educational institutions, governments, and businesses.

Video conferencing is a cost-effective way to hold meetings, eliminating the need for travel expenses, such as hotels and airfares, to facilitate in-person meetings. An added benefit of video conferencing is that it reduces productivity losses associated with the time required for meeting participants to travel to an in-person meeting. A further advantage of video conferencing is its ability to bring together participants from around the world, dramatically increasing collaboration and productivity for many businesses.

Video conferencing became a critical tool during the COVID-19 global pandemic, allowing businesses and others to maintain productivity while reducing participants' risk of infection. Some businesses, forced to employ video conferencing during the pandemic, discovered that productivity could be maintained or even improved with remote access and video conferencing. Some companies are even considering making part-time or full-time remote access and video conferencing part of their business model, allowing them in some situations to reduce the amount of expensive brick-and-mortar office space they require.

Video conferencing provides a convenient way for participants to collaborate in real time. For example, interactive online trade shows are becoming a popular way to avoid travel expenses while still providing an effective way to market products and services worldwide. It is also an effective communications tool for such activities as writing software, designing products, educational classes, and training. In addition, video conferencing can be used for brainstorming sessions, presenting demonstration videos, and making business communication more personal than is possible with audio-only communications.

Today, video conferencing is used by many industries, including health care, law enforcement, educators, attorneys, and marketers. However, current video conferencing systems lack features to provide a virtual experience that is similar to in-person meetings. There remains a need for a video conferencing system that is similar in look-and-feel as in-person meetings. There is a further need for an efficient way to record and evaluate input from video conferencing participants.

SUMMARY

Herein disclosed is a web-based video conferencing system and method. The method provides a multi-user platform for immersive and life-like online meeting or class experiences. The disclosed web-based conferencing system provides multi-user simultaneous assessment, automatic assessment with speech recognition, visual and audio feedback, performance reports, multi-user interaction, access to external programs and applications, and may be used on Apple computers, personal computers (PCs), mobile devices, and virtual reality (VR).

The currently disclosed web-based video conferencing system provides for a livelier and more engaging experience. The multi-user simultaneous assessment tool allows for the main user, such as a presenter or a teacher, to analyze the audience members' or students' responses while presenting or teaching. For example, in a class setting, students can learn by repeating after the teacher. The students' answers are assessed with speech recognition. The system then shows each student's answer, which the teacher can then review to identify problems. Further, the system also provides performance reports with audio recordings allowing the user, for example the teacher, to review the audience or each student's response. Moreover, the disclosed system may also provide the users with a variety of teaching or learning tools, such as the use of VR. For example, audience members or students may answer the presenter's or teacher's question using a VR chatbot.

The disclosed system also provides for multi-user interaction. Audience members, or students, may interact with each other. For example, similar to an in-person class, students may speak in pairs and the teacher can observe or interact with them. Further, unlike currently available conferencing systems, the disclosed web-based video conferencing system and method may be three-dimensional (3D). The 3D feature not only facilitates 3D movement for a more in-person interaction between participants, it also allows for the use of spatial audio, which may also increase the life-like experience. Similar to real life situations such as in a classroom, individuals who are farther from each other will hear each other less. This feature enables the users or audience members to interact with each other in a similar manner, as they would do in person.

The disclosed system and method provide the user with the ability to engage their audience using visuals and interactive features. Said features include a whiteboard with handwriting, screen sharing, document sharing and access to external programs and applications while using the system, providing for a fully and life-like collaborative experience.

BRIEF DESCRIPTION OF THE DRAWINGS

Further features of the present invention will become apparent to those skilled in the art to which the present invention relates from reading the following specification with reference to the accompanying drawings, in which:

FIG. 5 is an example report generated from operation of the video conferencing system of FIG. 4.

DETAILED DESCRIPTION

Figure 1:
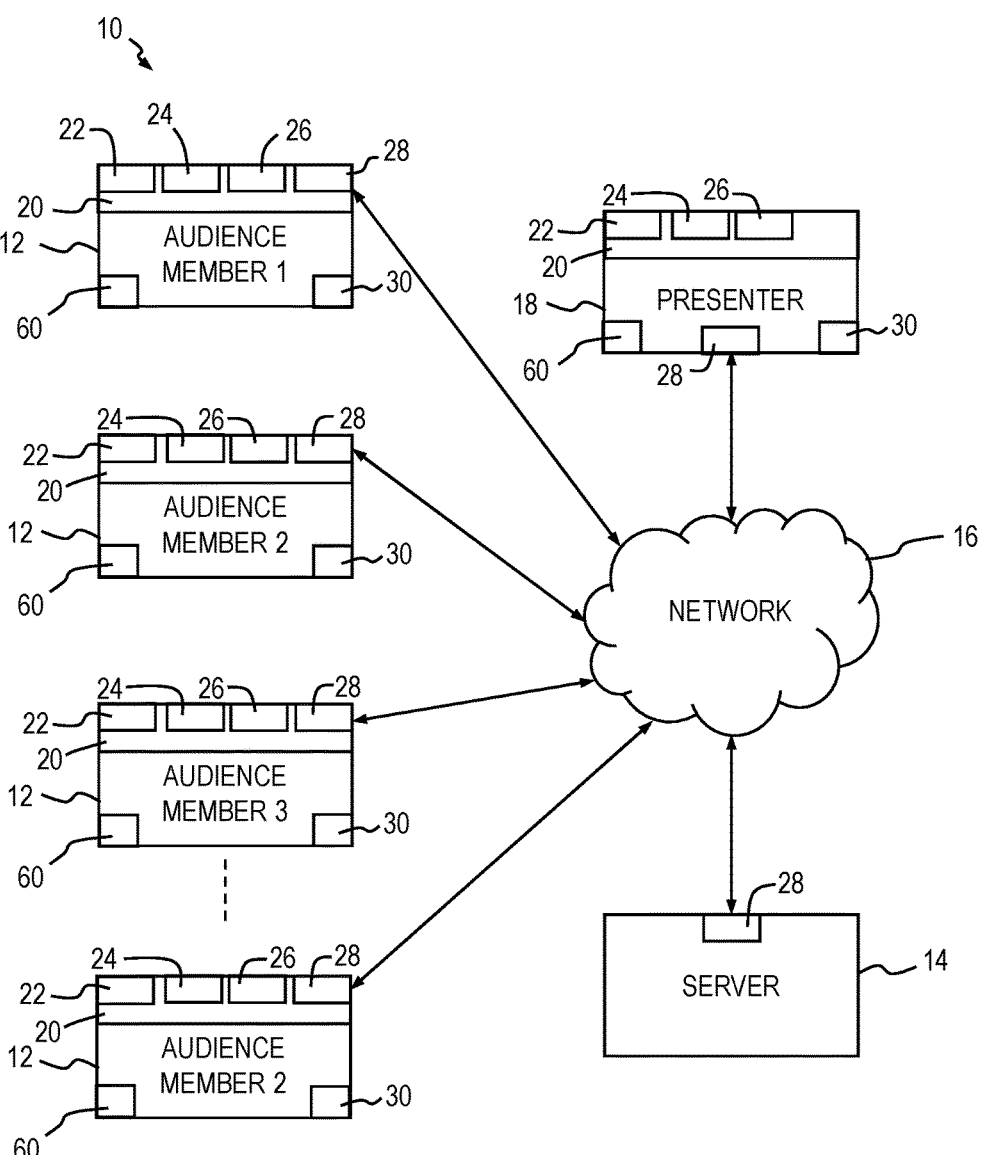
FIG. 1 is a diagram of a video conferencing system according to an embodiment of the present invention.

The general arrangement of a video conferencing system 10 is shown in FIG. 1 according to an embodiment of the present invention. One or more audience members 12, such as conference attendees, team members or students, communicate with a server 14 through a network 16. A presenter 18, such as a teacher, likewise communicates with server 14 through network 16.

Audience members 12 and presenter 18 may communicate with network 16 using any suitable computing device 20 such as, without limitation, desktop computers or portable computers (e.g., laptops) and mobile devices such as tablet computers and cellular telephones. Computing device 20 preferably includes a video display 22, a microphone 24, a web cam 26, a network connection 28, and a speaker 30.

Network 16 may be any suitable type of network now known or later invented. Examples include local area networks (LANS), wide area networks (WANS) and the World Wide Web (the "Web") of the Internet.

Speaker 30 may be internal to computing device 20, or may be a separate speaker or headphones.

The aforementioned network connection 28 may be accomplished using any suitable communications devices. Example network connections 28 include, but are not limited to, wired and wireless network connections, routers, Bluetooth connections, cellular network connections, and satellite connections. Network connections 28 are preferably bidirectional to facilitate the reception to, and transmissions from, audience members 12 and presenter 18.

Figure 2:
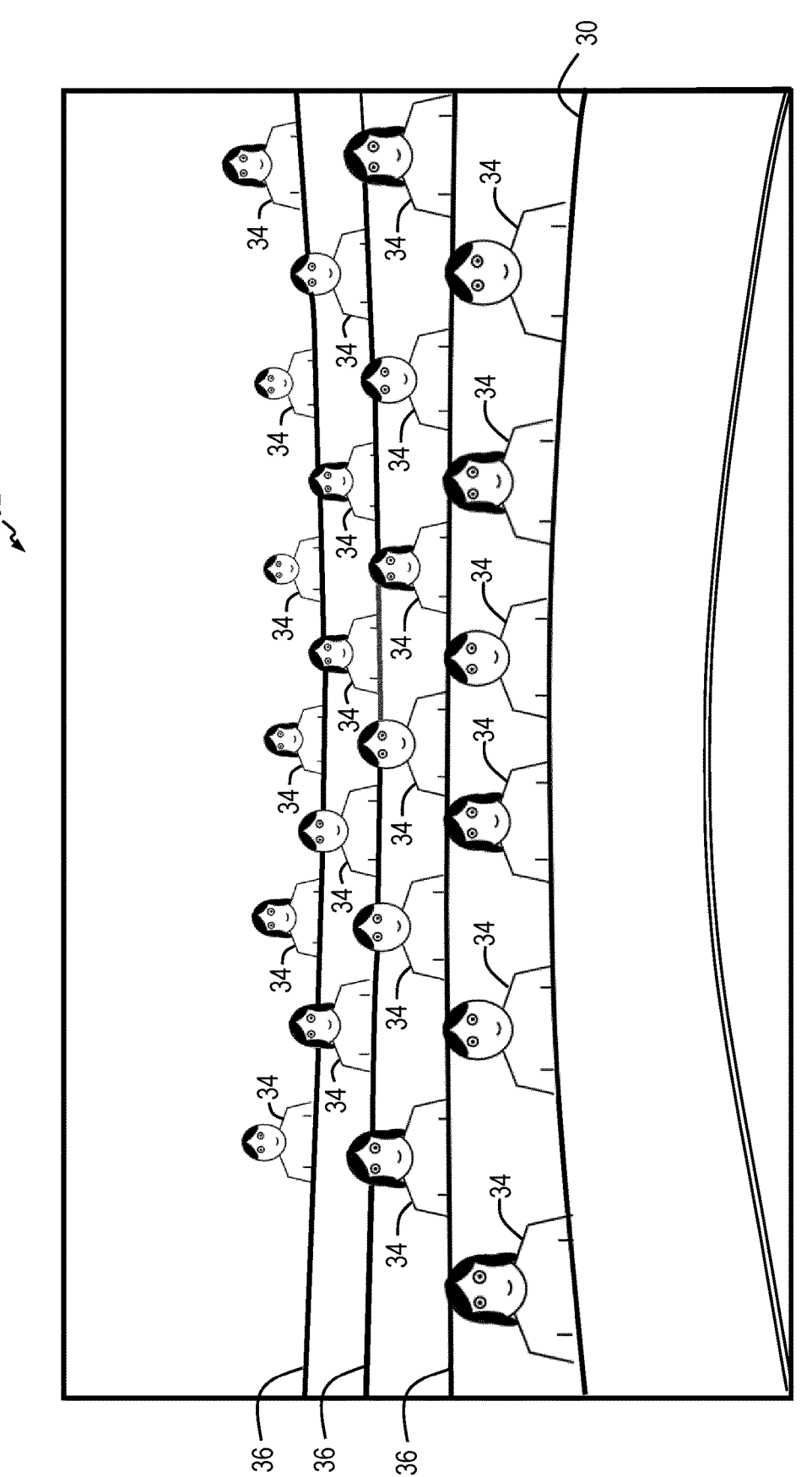
FIG. 2 shows a video rendering for the video conferencing system of FIG. 1 from the perspective of a presenter.

With reference now to FIGS. 1 and 2 together, a video rendering 32 of audience members 12 from the viewpoint of presenter 18 is shown in FIG. 2 according to an embodiment of the present invention. Audience member rendering 32 is an aggregation of a video image 34 of each audience member 12, captured by the audience member's corresponding web cam 28. In one embodiment, video rendering 32 includes a set of tiers 36 resembling a physical venue, such as a lecture hall, with the video images 34 of the audience members 12 being placed on the various tiers.

In some embodiments, the sizes of the video images 34 may be scaled to generally correspond with the perceived distance of the audience members 12 from a viewer of rendering 34. In this way, rendering 34 appears to the viewer to show a perspective view of audience members 12, with closer audience members being larger and more distant audience members being smaller. Audience member rendering 32 thus appears to a viewer as similar to an in-person situation, such as a classroom.

Microphones 24 (FIG. 1) allow audience members 12 and presenter 18 to each communicate aurally, the speech being heard via speakers 30. In one embodiment of the present invention, the audio generated by audience members 12 may be spatial such that the audio level generally corresponds to the audience member's "virtual distance" from the viewer as represented by rendering 34. Thus, for example, closer audience members 12 sound louder and clearer to presenter 18, while more distant audience members are not as loud. In this way, spatial audio generally replicates the aural experience of a presenter 18 at an in-person conference or meeting. The same spatial audio experience may be provided for each audience member 12, with the audio level varying for each audience member based on their distance from other audience members and presenter 18. Thus, similar to real life situations such as in a classroom, individuals who are farther from each other will hear each other less. This feature enables the presenter and audience members to interact with each other in a similar manner, as they would do in person.

Figure 3:
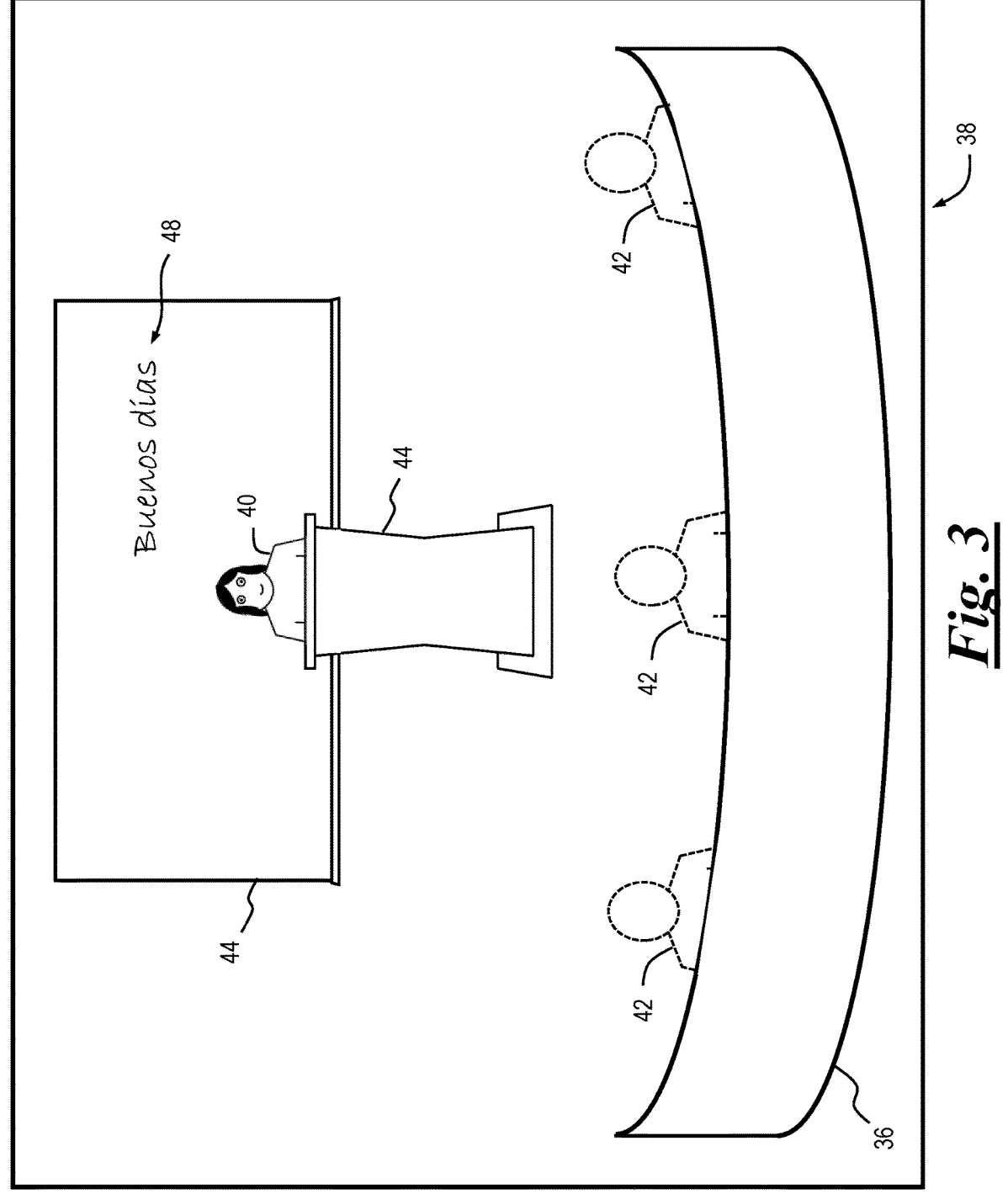
FIG. 3 shows a video rendering for the video conferencing system of FIG. 1 from the perspective of an audience member.

A presenter video rendering 38 from the viewpoint of audience members 12 is shown in FIG. 3 according to an embodiment of the present invention. Presenter video rendering 38 may include a video image 40 of presenter 18 and a representation of all or a portion of tiers 36 of the virtual venue. See-through representations 42 of audience members 12 may also be provided to give the audience members the look-and-feel-of sitting in an auditorium, a meeting room, a lecture hall, or the like. Video image 40 of presenter 18 may be positioned behind a podium 44. Alternatively, podium 44 may be omitted.

Presenter rendering 38 may include a whiteboard 46, and video image 40 of presenter 18 may be configured to show the presenter writing information 48 on the whiteboard, the writing being visible to audience members 12.

As can be seen from the foregoing discussion, system 10 and video renderings 32, 38 provide for a video conference between a presenter and audience members in a virtual venue that is visually arranged to resemble an in-person venue.

System 10 also provides for multi-user interaction. Audience members 12 may interact with each other and with presenter 18, and vice versa. For example, similar to an in-person class, audience members 12 may speak in pairs and presenter 18 can observe or interact with them.

Figure 4:
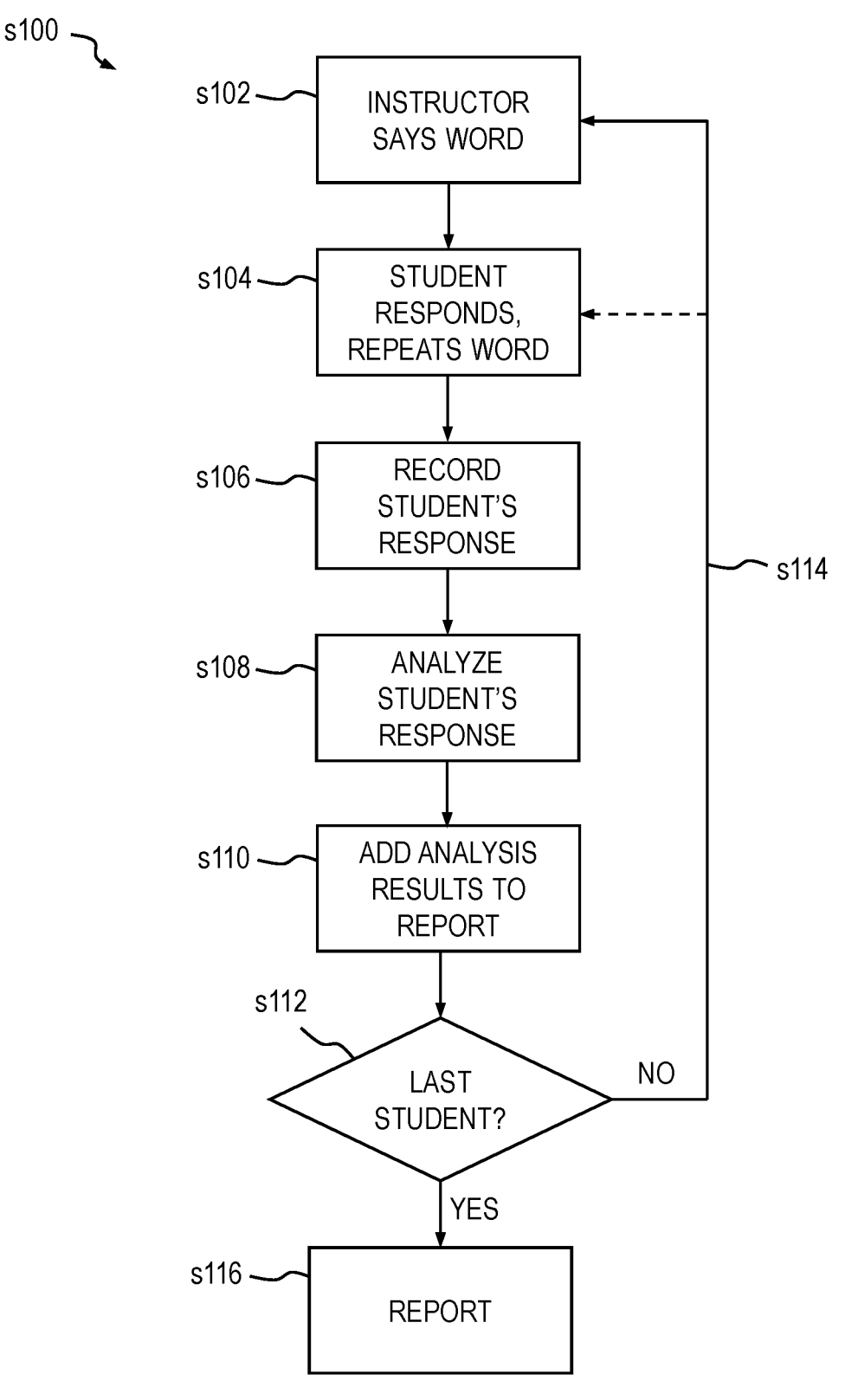
FIG. 4 is a flow diagram of the system of FIGS. 1 through 3 in operation.

With continued reference to FIGS. 1 through 3, an example flow diagram showing operating characteristics of a process s100 of system 10 when used for the purpose of language instruction is shown in FIG. 4. System 10 is preferably an internet web-based video conferencing platform that provides multi-user simultaneous assessments. As detailed further below, system 10 includes automatic assessment with speech recognition, along with visual and audio feedback. System 10 also provides performance reports with audio recordings to allow presenters (teachers) 18 to review audience members' (students') 12 responses and pronunciations. The multi-user interaction of audience members 12 and presenter 18 provides for a virtual venue that is visually arranged to resemble an in-person venue.

At step s102, an instructor (presenter) 18 speaks into their microphone 24 and says a word, phrase or sentence in the language to be learned.

At step s104, one or more students 12 (audience members) hear in their speakers 30 the word, phrase or sentence said by instructor 18. The students 12 respond by repeating into their microphones 24 the word, phrase or sentence. Preferably, students 12 respond one at a time, in groupings of two.

At step s106, a set of instructions 50, such as a computer program, application or software (generally "software"), stored in server 14 and executed by the server to operate system 10, records the speech issued by students 12 at s104. Instructor 18 may select and listen to the responses, if desired.

At step s108, software 50 uses speech recognition to compare the word, phrase or sentence said by the presenter at s102 to the responses of students 12 at step s104. At step s110, software 50 adds the results of the analysis to a report 52 (FIG. 5). A review is made at step s112 to see if all students 12 have responded.

If any students 12 have not responded, process s100 at step s114 returns to step s102 and presenter 18 repeats the word, phrase or sentence at step s102 with the process then continuing to the subsequent steps. Alternatively, process s100 returns to the next student at step s104 with the process then continuing to the subsequent steps.

Once all students have responded at step s112, a completed report 52 may be reviewed by instructor 18 at step s116. An example report 52 is shown in FIG. 5. Each row of report 52 is a summary of the performance of each student 12. A set of columns shows the responses of each student 12 provided at s104 to the prompts of instructor 18 at s102. If the response of each student 12 is correct, the word, phrase or sentence is listed. If the response of a student 12 is incorrect, a word, phrase or sentence showing how it was mispronounced may be displayed, if possible, and may be presented in a highlighted color, such as red. Alternatively, the positions for mispronounced words, phrases and sentences may be shown with a series of dots, an X, or the like, and may also be presented in a red color. A similar indication may be made for any students who do not respond at step s104. In another alternate embodiment, a color indication along with a symbol may be used to indicate correct and incorrect responses.

Report 52 may also include a score 54 for each student showing the percentage of correct responses. The score may also be shown in bar graph form 56. Score 54 and bar graph 56 may optionally be presented in colors indicating acceptable, marginal, and unacceptable performance with colors such as green, amber and red colors respectively. The thresholds for acceptable, marginal and unacceptable performance are flexible and may be set in software 50 by, for example, presenter 18.

Report 52 may further include a class performance calculation 58 showing a ratio of how many students 12 responded correctly to the number of number of words, phrases or sentences of step s102.

In the foregoing discussion, system 10 and process s100 are directed to language instruction. However, system 10 may be utilized in conjunction with video conferencing for any type of group setting. Non-limiting examples include instruction on subjects other than languages, presentations, team collaboration, meetings, conferences, sales presentations, and discussions.

System 10 may be provided to users with three-dimensional (3D) graphics as an element of software 50. The 3D software can also facilitate 3D movement, which can enable lifelike interaction between participants. The present invention may optionally augment the 3D graphics with the aforementioned spatial audio. With spatial audio, similar to real life, people who are farther from each other will hear each other less and vice-versa, thus providing for a group interaction closer to in-person interaction.

In some embodiments, the present invention may further include virtual reality (VR) equipment 60 (FIG. 1), permitting audience members 12 and presenter 18 to view and interact with video renderings 32, 38 virtually. Audience members or students 12 may answer a question given by the presenter or teacher 18 using a VR chatbot.

System 10 may further include screen sharing and document sharing. System 10 may further provide access to external programs and applications such as, for example, web browsers, word processors, spreadsheets, presentations, documents, and video while using the system.

From the above description of the invention, those skilled in the art will perceive improvements, changes, and modifications in the invention. Such improvements, changes, and modifications within the skill of the art are intended to be covered.

What is claimed is:

1. A video conferencing system, comprising:
a set of instructions; and
a server connectable to a first audience member computing device, a second audience member computing device, and a presenter computing device via a network, the server to execute the set of instructions to:
receive a first live video feed of a first audience member via a first webcam of the first audience member computing device;
receive first audio from the first audience member via a first microphone of the first audience member computing device;
receive a second live video feed of a second audience member via a second webcam of the second audience member computing device;
receive second audio from the second audience member via a second microphone of the second audience member computing device;
receive a third live video feed of a presenter via a third webcam of the presenter computing device;
cause a video conference involving the first audience member, the second audience member, and the presenter to be presented via the first audience member computing device such that video associated with the video conference is presented via a first display of the first audience member computing device and such that audio associated with the video conference is presented via a first speaker of the first audience member computing device;
cause the video conference to be presented via the second audience member computing device such that the video associated with the video conference is presented via a second display of the second audience member computing device and such that the audio associated with the video conference is presented via a second speaker of the second audience member computing device;
cause the video conference to be presented via the presenter computing device such that the video associated with the video conference is presented via a third display of the presenter computing device and such that the audio associated with the video conference is presented via a third speaker of the presenter computing device;

cause the video associated with the video conference to show the first live video feed of the first audience member at a first perceived virtual distance relative to the third live video feed of the presenter;

cause the video associated with the video conference to show the second live video feed of the second audience member at a second perceived virtual distance relative to the third live video feed of the presenter, the second perceived virtual distance being greater than the first perceived virtual distance;

cause the audio associated with the video conference to play the first audio from the first audience member at a first volume that is based on the first perceived virtual distance; and cause the audio associated with the video conference to play the second audio from the second audience member at a second volume that is based on the second perceived virtual distance, the first volume being louder than the second volume.

2. The video conferencing system of claim 1, wherein the server is to execute the set of instructions to:

cause the video associated with the video conference to show the first live video feed of the first audience member as a first video image having a first size that is based on the first perceived virtual distance; and cause the video associated with the video conference to show the second live video feed of the second audience member as a second video image having a second size that is based on the second perceived virtual distance, the first size being larger than the second size.

3. The video conferencing system of claim 2, wherein the server is to execute the set of instructions to cause the video associated with the video conference to show the first video image and the second video image within a virtual venue, the virtual venue comprising a virtual auditorium, a virtual lecture hall, or a virtual meeting room.

4. The video conferencing system of claim 3, wherein the server is to execute the set of instructions to cause the video associated with the video conference to show a whiteboard within the virtual venue and to update the whiteboard based on input received from the presenter computing device.

5. The video conferencing system of claim 1, wherein the server is to execute the set of instructions to:

receive third audio from the presenter via a third microphone of the presenter computing device, the third audio comprising a prompt to elicit a first response from the first audience member and to elicit a second response from the second audience member; and cause the audio associated with the video conference to play the third audio from the presenter.

6. The video conferencing system of claim 5, wherein the server is to execute the set of instructions to:

receive the first response from the first audience member computing device in response to the prompt;

determine a first set of characters that is indicative of the first response;

receive the second response from the second audience member computing device in response to the prompt; and determine a second set of characters that is indicative of the second response.

7. The video conferencing system of claim 6, wherein the server is to execute the set of instructions to:

perform speech recognition to determine a third set of characters associated with the third audio from the presenter;

compare the first set of characters to the third set of characters to determine a first score for the first response; and compare the second set of characters to the third set of characters to determine a second score for the second response.

8. The video conferencing system of claim 7, wherein the server is to execute the set of instructions to:

generate a report indicative of the first score and the second score; and cause the report to be presented via the third display of the presenter computing device.

9. The video conferencing system of claim 8, wherein:

the first audience member computing device comprises virtual reality equipment; and the server is to execute the set of instructions to receive the first response from the first audience member based on interaction that occurs between the first audience member and a virtual reality chatbot via the virtual reality equipment.

10. The video conferencing system of claim 1, wherein:

the first display of the first audience member computing device comprises virtual reality equipment; and the server is to execute the set of instructions to cause the video associated with the video conference to be presented via the first display of the first audience member computing device as three-dimensional video.

11. A video conferencing method, comprising:

receiving a first live video feed of a first audience member via a first webcam of a first audience member computing device;

receiving first audio from the first audience member via a first microphone of the first audience member computing device;

receiving a second live video feed of a second audience member via a second webcam of a second audience member computing device;

receiving second audio from the second audience member via a second microphone of the second audience member computing device;

receiving a third live video feed of a presenter via a third webcam of a presenter computing device;

causing a video conference involving the first audience member, the second audience member, and the presenter to be presented via the first audience member computing device such that video associated with the video conference is presented via a first display of the first audience member computing device and such that audio associated with the video conference is presented via a first speaker of the first audience member computing device;

causing the video conference to be presented via the second audience member computing device such that the video associated with the video conference is presented via a second display of the second audience member computing device and such that the audio associated with the video conference is presented via a second speaker of the second audience member computing device;

causing the video conference to be presented via the presenter computing device such that the video associated with the video conference is presented via a third display of the presenter computing device and such that the audio associated with the video conference is presented via a third speaker of the presenter computing device;

causing the video associated with the video conference to show the first live video feed of the first audience member at a first perceived virtual distance relative to the third live video feed of the presenter;

causing the video associated with the video conference to show the second live video feed of the second audience member at a second perceived virtual distance relative to the third live video feed of the presenter, the second perceived virtual distance being greater than the first perceived virtual distance;

causing the audio associated with the video conference to play the first audio from the first audience member at a first volume that is based on the first perceived virtual distance; and causing the audio associated with the video conference to play the second audio from the second audience member at a second volume that is based on the second perceived virtual distance, the first volume being louder than the second volume.

12. The video conferencing method of claim 11, comprising:

causing the video associated with the video conference to show the first live video feed of the first audience member as a first video image having a first size that is based on the first perceived virtual distance; and causing the video associated with the video conference to show the second live video feed of the second audience member as a second video image having a second size that is based on the second perceived virtual distance, the first size being larger than the second size.

13. The video conferencing method of claim 12, comprising causing the video associated with the video conference to show the first video image and the second video image within a virtual venue, the virtual venue comprising a virtual auditorium, a virtual lecture hall, or a virtual meeting room.

14. The video conferencing method of claim 13, comprising causing the video associated with the video conference to show a whiteboard within the virtual venue and updating the whiteboard based on input received from the presenter computing device.

15. The video conferencing method of claim 11, comprising:

receiving third audio from the presenter via a third microphone of the presenter computing device, the third audio comprising a prompt to elicit a first response from the first audience member and to elicit a second response from the second audience member; and causing the audio associated with the video conference to play the third audio from the presenter.

16. The video conferencing method of claim 15, comprising:

receiving the first response from the first audience member computing device in response to the prompt;

determining a first set of characters that is indicative of the first response;

receiving the second response from the second audience member computing device in response to the prompt; and determining a second set of characters that is indicative of the second response.

17. The video conferencing method of claim 16, comprising:

performing speech recognition to determine a third set of characters associated with the third audio from the presenter;

comparing the first set of characters to the third set of characters to determine a first score for the first response; and comparing the second set of characters to the third set of characters to determine a second score for the second response.

18. The video conferencing method of claim 17, comprising:

generating a report indicative of the first score and the second score; and causing the report to be presented via the third display of the presenter computing device.

19. The video conferencing method of claim 18, wherein:

the first audience member computing device comprises virtual reality equipment; and the video conferencing method comprises receiving the first response from the first audience member based on interaction that occurs between the first audience member and a virtual reality chatbot via the virtual reality equipment.

20. The video conferencing method of claim 11, wherein:

the first display of the first audience member computing device comprises virtual reality equipment; and the video conferencing method comprises causing the video associated with the video conference to be presented via the first display of the first audience member computing device as three-dimensional video.

* * * * *